United States Patent [19]
Yasui et al.

[11] Patent Number: 6,163,022
[45] Date of Patent: Dec. 19, 2000

[54] IMAGING APPARATUS, DISTANCE MEASUREMENT APPARATUS AND METHOD FOR MEASURING DISTANCE

[75] Inventors: Nobuhiko Yasui, Moriguchi; Noboru Nomura, Kyoto; Atsushi Iisaka, Takatsuki, all of Japan

[73] Assignee: Matsushita Electric Industrial Co., Ltd., Osaka, Japan

[21] Appl. No.: 09/080,854

[22] Filed: May 18, 1998

[30] Foreign Application Priority Data

May 20, 1997 [JP] Japan .................................. 9-129259

[51] Int. Cl.[7] .................................................. H01L 27/00
[52] U.S. Cl. ...................... 250/208.1; 348/262; 348/343; 250/216
[58] Field of Search ............................ 250/208.1, 208.2, 250/216, 559.38; 348/212, 342, 343, 344

[56] References Cited

U.S. PATENT DOCUMENTS

| | | | |
|---|---|---|---|
| 3,562,537 | 2/1971 | Miller, Jr. .............................. | 250/208.2 |
| 4,876,591 | 10/1989 | Muramatsu ............................. | 348/236 |
| 4,942,533 | 7/1990 | Kakinami et al. ...................... | 364/449 |
| 5,051,830 | 9/1991 | von Hoessle ........................... | 358/209 |
| 5,132,802 | 7/1992 | Osthues et al. ......................... | 348/262 |
| 5,172,235 | 12/1992 | Wilm et al. ............................. | 358/226 |
| 5,555,312 | 9/1996 | Shima et al. ............................ | 382/104 |

FOREIGN PATENT DOCUMENTS

| | | |
|---|---|---|
| 0501345 | 9/1992 | European Pat. Off. . |
| 0591743 | 4/1994 | European Pat. Off. . |
| 0626654 | 11/1994 | European Pat. Off. . |
| 19505244 | 2/1995 | Germany . |
| 06331335 | 12/1994 | Japan . |
| 07129899 | 5/1995 | Japan . |
| 07334800 | 12/1995 | Japan . |
| 08075454 | 3/1996 | Japan . |

OTHER PUBLICATIONS

Search Report for Application No. 98109074.9–2306–; Dated Aug. 24, 1998 (EPO).

E.D. Dickmanns, At Automatisierungstechnik, vol. 44, No. 5, May 1, 1996, pp. 243–251, "Entwicklungsschritte Zur Erhohung Von Sicherheit Und Komfort Durch Sehende Autos".

*Primary Examiner*—Que T. Le
*Assistant Examiner*—Thanh X. Luu
*Attorney, Agent, or Firm*—Renner, Otto, Boisselle & Sklar LLP

[57] ABSTRACT

The imaging apparatus of this invention includes: a lens, a half mirror, and a first CCD arranged along a same optical axis; and a second CCD arranged on an axis of light reflected from the half mirror, wherein one of the first and second CCDs outputs a normal image of an input image input via the lens while the other CCD outputs an Inverted image of the input image.

7 Claims, 7 Drawing Sheets

Bottom edge

FIG. 12

IMAGING APPARATUS, DISTANCE MEASUREMENT APPARATUS AND METHOD FOR MEASURING DISTANCE

BACKGROUND OF THE INVENTION

1. Field of the Invention

The present invention relates to an imaging apparatus which, in order to grasp the status of a road, images an object using a plurality of CCDs to detect an obstacle and the like on the road, and a distance measurement apparatus for calculating the distance between the car and the object.

2. Description of the Related Art

In recent years, with the increasing interest in the automobile safety, the demand of being able to drive a car while keeping a safe distance between the car and a car travelling ahead, as well as the demand for an apparatus which can detect in advance an obstacle and the like on a road and urge the driver to avoid the obstacle, have increased and will further increase. In order to satisfy these demands, it has been started to observe the road ahead of his or her car using an imaging apparatus.

A conventional distance measurement apparatus is described in Japanese Laid-Open Publication No. 8-75454, for example. This conventional distance measurement apparatus will be described with reference to FIG. 12.

Figure 12:
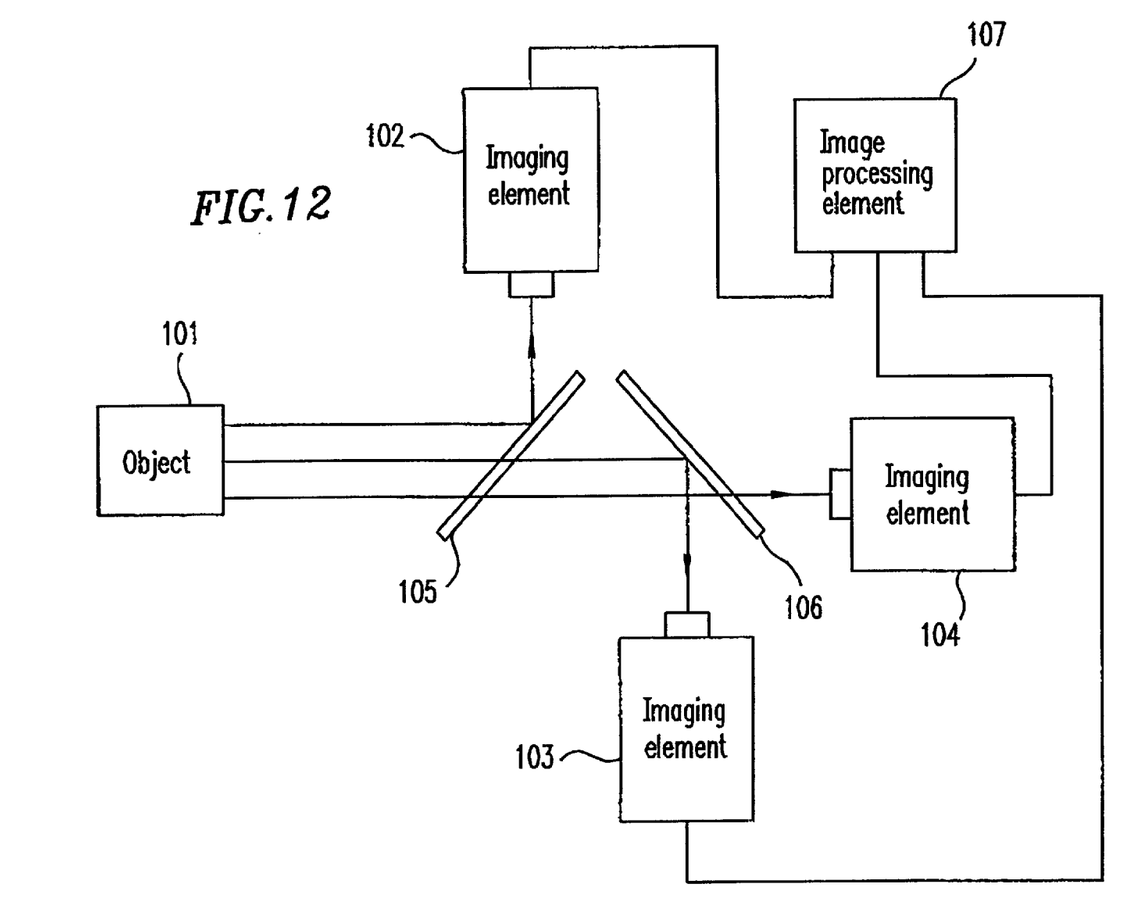
FIG. 12 is view illustrating a conventional distance measurement apparatus.

Referring to FIG. 12, the conventional distance measurement apparatus includes imaging elements 102, 103, and 104, half mirrors 105 and 106, and an image processing element 107.

The operation of the conventional distance measurement apparatus with the above configuration will be described. The distance measurement apparatus images an object 101 using the imaging elements 102, 103, and 104 so that the horizontal or vertical parallax between the adjacent imaging elements constitutes several pixels. The image processing element 107 receives a plurality of imaged video signals simultaneously to synthesize video signals on the same horizontal or vertical lines among the plurality of video signals and thus to produce an image for parallax detection. Using the produced image for parallax detection, the parallax is obtained from the tilt of a straight line formed by points corresponding to the edges of the object 101, and then the distance between the car and the object 101 is calculated based on the parallax.

The conventional distance measurement apparatus with the above configuration is disadvantageous in the following points. Since the conventional distance measurement apparatus includes a plurality of imaging elements, the following problems arise. It is not easy to accommodate such an apparatus in a small space inside a car. Two optical systems are required, increasing the production cost. The resolution of each pixel is as small as about 50 cm for an object located about 100 m distant from the car, which fails to provide a sufficient distance measurement performance. The plurality of optical systems need to be aligned with one another with high precision, resulting in the difficulty in adjustment and an increase in maintenance cost.

SUMMARY OF THE INVENTION

The imaging apparatus of this invention includes: a lens, a half mirror, and a first CCD arranged along a same optical axis; and a second CCD arranged on an axis of light reflected from the half mirror, wherein one of the first and second CCDS outputs a normal image of an input image input via the lens while the other CCD outputs an inverted image of the input image.

In one embodiment of the invention, the imaging apparatus further includes a wavelength selective optical element on an optical path from the lens to at least one of the first and second CCDs.

In another embodiment of the invention, the wavelength selective optical element is an infrared filter.

In still another embodiment of the invention, the half mirror also functions as the wavelength selective optical element which selectively reflects Infrared radiation.

In still another embodiment of the invention, the half mirror also functions as the wavelength selective optical element which selectively transmits infrared radiation.

In still another embodiment of the invention, the imaging apparatus further Includes a magnifying lens on an optical path from the lens to at least one of the first and second CCDs.

In still another embodiment of the invention, the imaging apparatus further includes a circuit for detecting a correlation between the normal image and the inverted image.

According to another embodiment of the invention, a distance measurement apparatus for measuring a distance between cars is provided. The apparatus includes: a visible-light and infrared imaging section for imaging visible-light and infrared images of a road ahead of a car; a visible-light and infrared image lane detection section for detecting a lane along which the car is travelling by using the visible-light and infrared images received from the visible-light and infrared imaging section; a visible-light and infrared image delimitation section for delimiting an area of the lane along which the car is travelling in the images received from the visible-light and infrared image lane detection section by using the lane along which the car is travelling detected by the visible-light and infrared image lane detection section; a visible-light and infrared car characteristic detection section for detecting characteristics of the car in the area delimited by the visiblelight and infrared image delimitation section by sequentially scanning the area from a bottom of the images; and a visible-light and infrared distance calculation section for calculating a distance between the car and a car travelling ahead by extracting a car characteristic closest to the bottom of the images among the car characteristics detected by the car characteristic detection section.

Alternatively, the distance measurement apparatus for measuring a distance between cars of this invention includes: a telescopic and wide-angle imaging section for imaging telescopic and wide-angle images of a road ahead of a car; a telescopic and wide-angle image lane detection section for detecting a lane along which the car is travelling by using the telescopic and wide-angle images received from the telescopic and wide-angle imaging section; a telescopic and wide-angle image delimitation section for delimiting an area of the lane along which the car is travelling ahead of the car in the images received from the telescopic and wide-angle image lane detection section by using the lane along which the car is travelling detected by the telescopic and wide-angle image lane detection section; a telescopic and wide-angle car characteristic detection section for detecting characteristics of the car in the area delimited by the telescopic and wide-angle image delimitation section starting from a bottom of the Images; and a telescopic and wide-angle distance calculation section for calculating a distance between the car and a car travelling ahead by extracting a car characteristic closest to the bottom of the images among the car characteristics detected by the telescopic and wide-angle car characteristic detection section.

In one embodiment of the invention, the telescopic and wide-angle image lane detection section measures an amount of vibration obtained from the telescopic and wide-angle imaging section, to correct an influence of the vibration.

Alternatively, the distance measurement apparatus for measuring a distance between cars of this invention includes: a telescopic and wide-angle imaging section for imaging telescopic and wide-angle images of a road ahead a car; a telescopic and wide-angle image lane area detection section for detecting a lane area where the car is travelling by using the telescopic and wide-angle images received from the telescopic and wide-angle imaging section; and a telescopic and wide-angle distance calculation section for calculating a distance between the car and a car travelling ahead by using the lane area where the car is travelling detected by the telescopic and wide-angle image lane area detection section.

In one embodiment of the invention, the telescopic and wide-angle image lane area detection section measures an amount of vibration obtained from the telescopic and wide-angle imaging section, to correct an influence of the vibration.

Alternatively, the distance measurement apparatus for measuring a distance between cars of this invention includes: a telescopic and wide-angle imaging section for imaging telescopic and wide-angle images of a road ahead of a car; a telescopic and wide-angle image lane detection section for detecting a lane along which the car is travelling by using the telescopic and wide-angle images received from the telescopic and wide-angle imaging section; a telescopic and wide-angle image delimitation section for delimiting an area of the lane along which the car is travelling ahead of the car in the images received from the telescopic and wide-angle image lane detection section by using the lane along which the car is travelling detected by the telescopic and wide-angle image lane detection section; a telescopic and wide-angle car characteristic detection section for detecting characteristics of the car in the area delimited by the telescopic and wide-angle image delimitation section starting from a bottom of the images; a telescopic car tracing section for extracting a car characteristic closest to the bottom of the image among the car characteristics detected by a telescopic portion of the telescopic and wide-angle car characteristic detection section and tracing the extracted car characteristic; a car determination section for determining that a car detected by a wide-angle portion of the telescopic and wide-angle car characteristic detection section is identical to the car traced by the telescopic car tracing section; and a wide-angle distance calculation section for calculating a distance between the car and a car travelling ahead by using a car characteristic from the car determination section obtained when the car determined by the car determination section has just moved outside from the bottom of the image in the telescopic car tracing section.

According to still another aspect of the invention, a method for measuring a distance between cars is provided. The method includes the steps of: imaging visible-light and infrared images of a road ahead of a car; detecting a lane along which the car is travelling by using the visible-light and infrared images obtained by the visible-light and infrared imaging step; delimiting an area of the lane along which the car is travelling in the images obtained by the visible-light and infrared image lane detection stop by using the lane along which the car Is travelling detected by the visible-light and infrared image lane detection section; detecting characteristic of the car in the area delimited by the visible-light and infrared image delimitation step by sequentially scanning the area from a bottom of the images; and calculating a distance between the car and a car travelling ahead by extracting a car characteristic closest to the bottom of the images among the car characteristics detected by the car characteristic detection step.

Alternatively, the method for measuring a distance between cars of this invention includes the steps of: imaging telescopic and wide-angle images of a road ahead of a car; detecting a lane along which the car is travelling by using the telescopic and wide-angle images obtained by the telescopic and wide-angle imaging step; delimiting an area of the lane along which the car is travelling ahead of the car in the images received from the telescopic and wide-angle image lane detection section by using the lane along which the car is travelling detected by the telescopic and wide-angle image lane detection section; detecting characteristics of the car in an area delimited by the telescopic and wide-angle image delimitation section starting from a bottom of the images; and calculating a distance between the car and a car travelling ahead by extracting a car characteristic closest to the bottom of the images among the car characteristics detected by the telescopic and wide-angle car characteristic detection section.

In one embodiment of the invention, the step of detecting a lane along which the car is travelling includes the step of measuring an amount of vibration obtained from the telescopic and wide-angle imaging section, to correct an influence of the vibration.

Alternatively, the method for measuring a distance between cars of this invention includes: imaging telescopic and wide-angle images of a road ahead of a car; detecting a lane area where the car is travelling by using the telescopic and wide-angle images received from the telescopic and wide-angle imaging sections and calculating a distance between the car and a car travelling ahead by using the lane area where the car is travelling detected by the telescopic and wide-angle image lane area detection section.

In one embodiment of the invention, the step of detecting a lane area where the car is travelling includes the step of measuring an amount of vibration obtained from the telescopic and wide-angle imaging section, to correct an influence of the vibration.

Alternatively, the method for measuring a distance between cars of this invention includes the steps of: imaging telescopic and wide-angle images of a road ahead of a car; detecting a lane along which the car is travelling by using the telescopic and wide-angle images received from the telescopic and wide-angle imaging section; delimiting an area of the lane along which the car is travelling ahead of the car in the images received from the telescopic and wide-angle image lane detection section by using the lane along which the car is travelling detected by the telescopic and wide-angle image lane detection section; detecting characteristics of the car in the area delimited by the telescopic and wide-angle image delimitation section starting from a bottom of the images; extracting a car characteristic closest to the bottom of the image among the car characteristics detected by a telescopic portion of the telescopic and wide-angle car characteristic detection section and tracing the extracted car characteristic; determining that a car detected by a wide-angle portion of the telescopic and wide-angle car characteristic detection section is identical to the car traced by the telescopic car tracing section; and calculating a distance between the car and a car travelling ahead by using a car characteristic from the car determination section obtained when the car determined by the car determination section has just moved outside from the bottom of the image in the telescopic car tracing section.

Thus, the invention described herein makes possible the advantages of (1) providing a small-size, high-precision imaging apparatus with easy maintenance using an optical system for detecting an obstacle on a road and the like, and (2) a distance measurement apparatus and a method for calculating the distance between cars using the imaging apparatus.

These and other advantages of the present invention will become apparent to those skilled in the art upon reading and understanding the following detailed description with reference to the accompanying figures.

DESCRIPTION OF THE PREFERRED EMBODIMENTS

The present invention is directed to an apparatus used for adaptive cruise control and the like, which measures the distance between a car and another car travelling ahead, where the measurement of the distance between the car and a white line, an obstacle on a road ahead, or a car travelling ahead, is performed with high precision by superimposing images imaged by two CCDs disposed side by side along one optical axis and comparing these images.

Alternatively, a color filter (a wavelength selective optical element) such as an infrared filter is disposed at the two CCDs, and the images imaged by the two CCDs are superimposed and compared so as to extract the characteristics of a car travelling ahead or an obstacle on a road. As a result, the distance between the car and the car travelling ahead can be measured with higher precision.

Alternatively, telescopic and wide-angle optical systems are disposed for the two CCDS, and the telescopic and wide-angle images obtained from the two CCDs which are disposed side by side along one optical axis are superimposed and compared. The resultant telescopic image corresponds to a magnified image of a portion of the wide-angle image has been magnified. The characteristics of a car travelling ahead or an obstacle on a road are extracted, and as a result, the distance between the car and the object or the car travelling ahead can be measured with higher precision.

Alternatively, telescopic and wide-angle optical systems are disposed at the two CCDs, and the telescopic and wide-angle images imaged by the two CCDs which are disposed side by side along one optical axis are superimposed and compared. The resultant telescopic image corresponds to a magnified image of a portion of the wide-angle image has been magnified. Thus, by comparing an object entering or leaving the telescopic image with an object moving in the wide-angle image, a car travelling ahead or an obstacle on the road can be extracted.

As a result, the distance between the car and the object or the car travelling ahead can be measured with higher precision.

The two CCDs are disposed side by side along one optical axis, as described above. Accordingly, when the apparatus according to the present invention is to be installed in a car, a reference for the measurement of the distance between cars should be set and adjusted by setting the position of a fade-out point or the position corresponding to a predetermined distance at a predetermined position in the image.

Hereinbelow, the present invention will be described by way of example with reference to the accompanying drawings.

EXAMPLE 1

Figure 1:
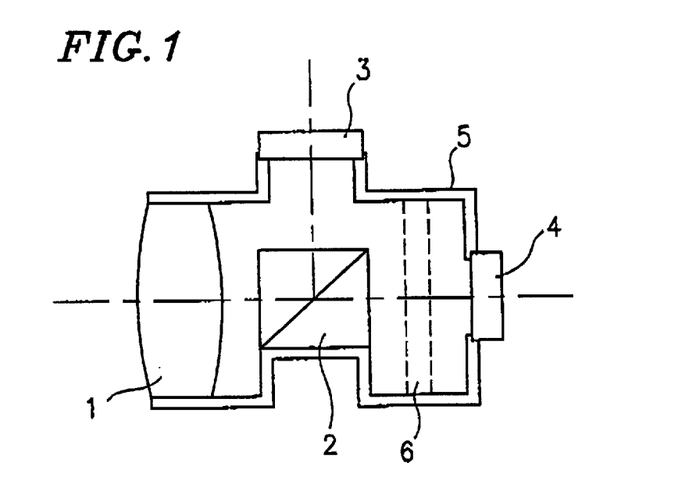
FIG. 1 is a schematic view of an optical system for an imaging apparatus of Example 1 according to the present invention.

FIG. 1 is a schematic view of an optical system for an imaging apparatus of Example 1 according to the present invention. The optical system in this example includes a lens 1, a half mirror 2, a first CCD 3, a second CCD 4, and a housing 5.

In the optical system for the imaging apparatus, the lens 1, the half mirror 2, and the second CCD 4 are arranged coaxially, while the first CCD 3 is arranged along an axis of light reflected by the half mirror 2. A color filter 6 may be disposed between the half mirror 2 and the first CCD 3 or the second CCD 4, if required.

The operation of the imaging apparatus with the above configuration will be described with reference to FIGS. 1, 2A, and 2B.

Part of light incident on the lens 1 is reflected by the half mirror 2 to be focused as a mirror image an the first CCD 3 disposed along the axis of the reflected light. The remainder of the incident light which has passed through the half mirror 2 is focused as a normal image on the second CCD 4.

Figure 2A:
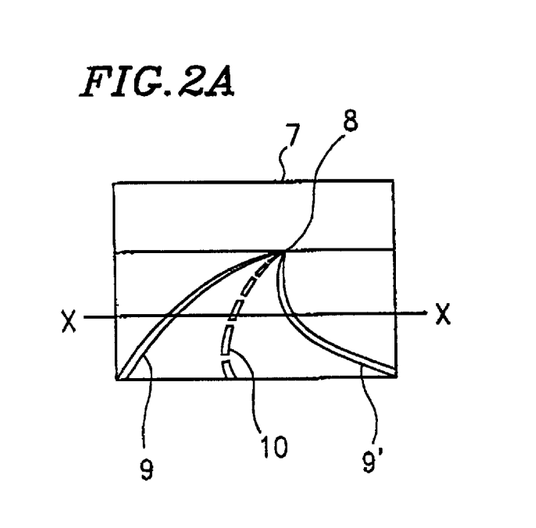
FIG. 2A is a view illustrating a normal image obtained on a second CCD in Example 1.

FIG. 2A illustrates a normal image 7 obtained on the second CCD 4. A fade-out point 8 in the normal image 7 is an infinite point on a road. Left and right white lines 9 and 9' on the road intersect with each other at the fade-out point 8 as the infinite point. A broken line 10 on the road also intersects with the white lines 9 and 9' at the fade-out point 8.

Figure 2B:
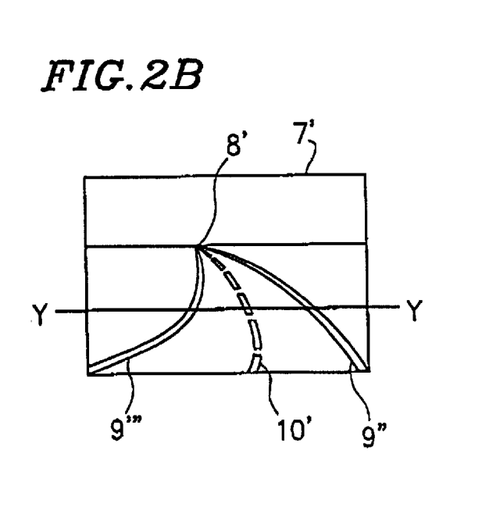
FIG. 2B is a view illustrating a mirror image of the normal image of FIG. 2A obtained on a first CCD in Example 1.

FIG. 2B illustrates a mirror image 7' of the normal image 7 obtained on the first CCD 3. As in FIG. 2A, a fade-out point 8' in the mirror image 7' is an infinite point on the road. Left and right white lines 9" and 9'" intersect with each other at the fade-out point 8' as the infinite point. A broken line 10' on the road also intersects with the white lines 9" and 9'" at the fade-out point 8'.

Figure 3A:
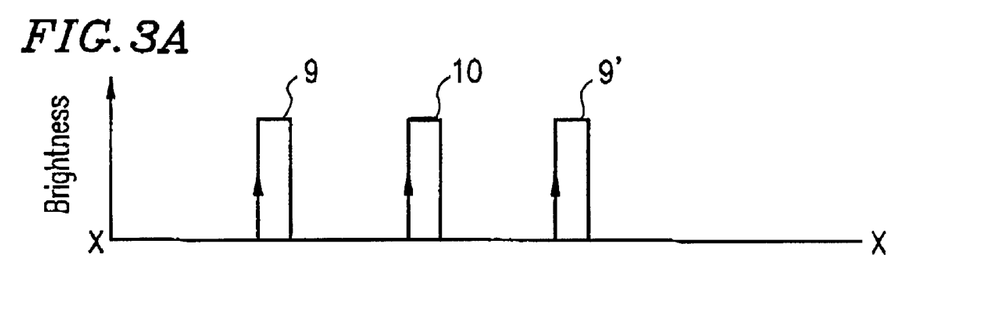
FIGS. 3A and 3B are views schematically illustrating changes in brightness signals along a raster X—X in FIG. 2A and raster Y—Y in FIG. 2B, respectively.
Figure 3B:
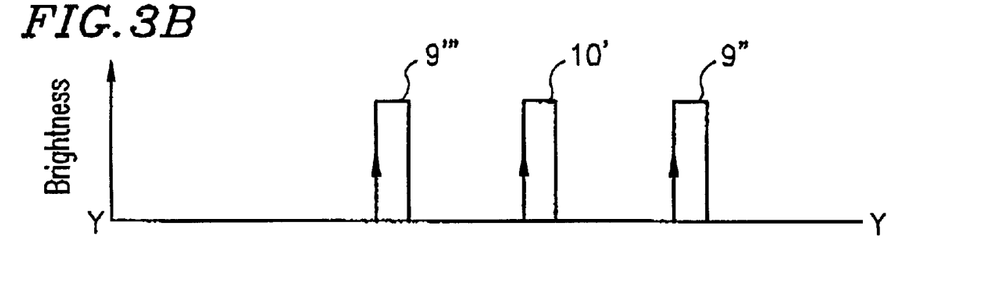

FIGS. 3A and 3B schematically show changes in brightness signals along a raster X—X in FIG. 2A and a raster Y—Y in FIG. 2B, respectively. In FIG. 2A, the left white line 9, the broken line 10, and the right white line 9' on the road are positioned in the order from left to right In the normal image 7 obtained on the second CCD 4, and the signal X—X of FIG. 3A represents the change in brightness in the above order. When the rising of the brightness of the white line is used for the detection of the white line 9, the left edge of the white line is detected. Likewise, the left edges of the broken line 10 and the right white line 9' are detected in this order, thus continuously detecting the white lines along the raster. In this way, the geometry of the road using the left edges of the white lines is recognized.

In FIG. 2B, the right white line 9'", the broken line 10', and the left white line 9" on the road are positioned in the order from left to right in the mirror image 7' obtained on the first CCD 3, and the signal Y—Y of FIG. 3B represents the change in brightness in the above order. The rising of the brightness of the white line is used for the detection of the white line 9'" as in FIG. 3A. In this case, however, since the mirror image is scanned from left to right, the right edge of the white line is detected. Likewise, the right edges of the broken line 10' and the left white line 9" are detected in this order, thus continuously detecting the white lines along the raster. In this way, the geometry of the road using the right edges of the white lines is recognized.

Thus, the road geometry using the left edges of the white lines and the road geometry using the right edges of the white lines are recognized by individual signals having no correlation with each other. Each of these two road geometries is basically obtained by shifting the other in a horizontal direction by a distance corresponding to the width of the white lines (about 15 cm). Since they are recognized by individual signals, in the case where the white lines are blurred or defective, such a blurred or defective portion can be complemented by the correlation without mutual interference. In this way, the precision of the recognition of the white lines can be improved.

Moreover, since one raster is scanned from the opposite directions of an image simultaneously, the image can be taken and processed in parallel at high speed, allowing for high-speed image recognition.

Furthermore, since two CCDs are incorporated in one optical system, such an optical system is small in size. This is suitable for applications in cars where a smaller apparatus is required.

EXAMPLE 2

In Example 2, in the optical system of the imaging apparatus of FIG. 1 where the lens 1, the half mirror 2, and the second CCD 4 are arranged coaxially, a color filter 6 is additionally disposed between the half mirror 2 and the second CCD 4.

The operation of the imaging apparatus of this example will be described with reference to FIGS. 4A and 4B.

Figure 4A:
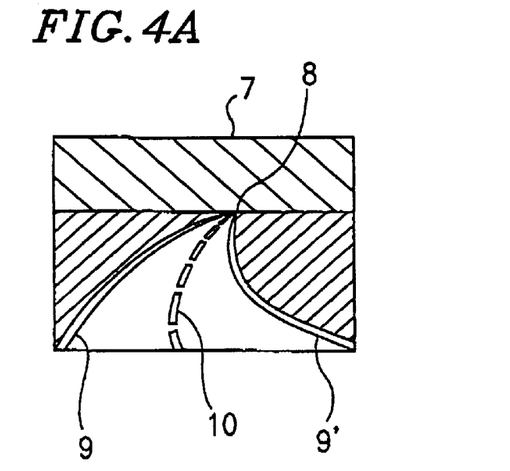
FIG. 4A is a view illustrating a normal image which has passed a color filter obtained on a second CCD in Example 2.

In FIG. 4A, a normal image 7 obtained on the second CCD 4 has passed through the color filter 6. When an infrared filter is used as the color filter 6, a portion of a road surface, for example, which reflects or emits infrared radiation appears rising from the surrounding image. In particular, since the road is uniform and has a temperature different from that of the surrounding area, the road is characterized as rising from the surrounding area. A brightness signal similar to that obtained along the raster X—X in FIG. 2A is obtained, and the left edge of a white line 9 on the road is detected. Likewise, the left edges of a broken line 10 and a left white line 9' are detected in this order, thus continuously detecting the white lines along the raster. In this way, the geometry of the road using the left edges of the white lines is recognized.

Figure 4B:
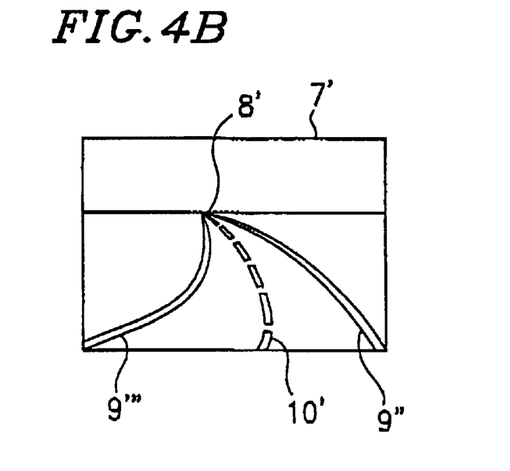
FIG. 4B is a view Illustrating a mirror image of the normal image of FIG. 4A obtained on a first CCD in Example 2.

FIG. 4B illustrates a mirror image 7' of the normal image 7 obtained on the first CCD 3. As in FIG. 2B, the geometry of the road using the right edges of the white lines is recognized by continuously detecting the white lines along the raster.

Thus, in Example 2, the road geometry using the left edges of the white lines is obtained from the image which had passed through the color filter. Accordingly, the resultant road geometry is different in contrast from the road geometry using the right edges of the white lines obtained from the image without using a color filter. The road geometry using the left edges of the white lines and the road geometry using the right edges of the white lines are recognized by individual signals having no correlation with each other.

Each of the two road geometries is basically obtained by shifting the other in the horizontal direction by a distance corresponding to the width of the white lines (about 15 cm). In the case where the white lines are blurred or defective, such a blurred or defective portion can be complemented by mutual correlation. In this way, the precision of the recognition of the white lines can be improved.

Alternatively, the half mirror 2 may incorporate a color filter which reflects only infrared radiation or a color filter which transmits only infrared radiation. In such a case, essentially the same effect as that described above obtained by the apparatus of Example 2 where the color filter is disposed between the half mirror 2 and the second CCD 4 can be obtained.

EXAMPLE 3

Figure 5:
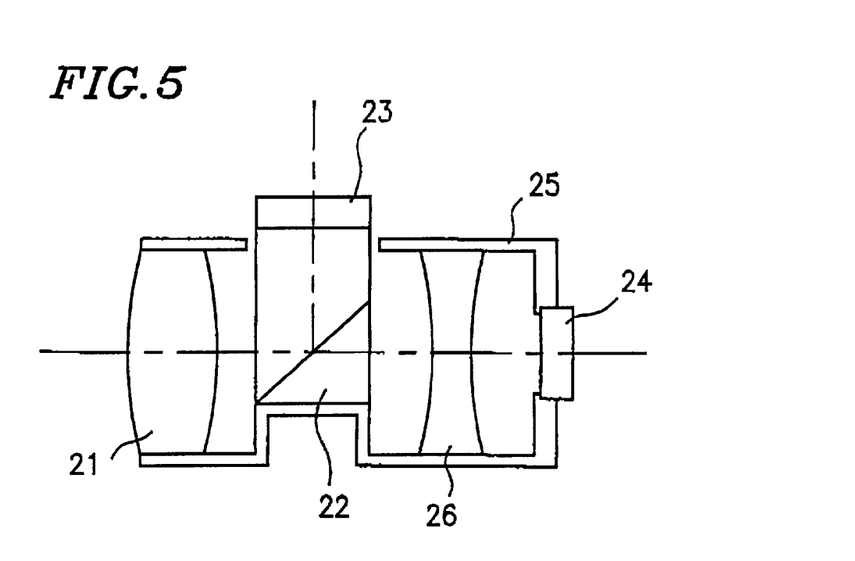
FIG. 5 is a schematic view of an optical system for an imaging apparatus of Example 3 according to the present invention.

FIG. 5 is a schematic view of an optical system for an imaging apparatus of Example 3 according to the present invention. The optical system includes a lens 21, a half mirror 22, a first CCD 23, a second CCD 24, a housing 25, and a magnifying lens 26.

In the optical system for the imaging apparatus of this example, the lens 21, the half mirror 22, the magnifying lens 26, and the second CCD 24 are arranged coaxially, while the first CCD 23 is arranged along an axis of light reflected by the half mirror 22.

The operation of the imaging apparatus with the above configuration will be described with reference to FIGS. 5, 6A, and 6B.

Part of light incident on the lens 21 is reflected by the half mirror 22 to be focused as a wide-angle mirror image on the first CCD 23 disposed along the axis of the reflected light. The remainder of the incident light which has passed through the half mirror 22 is magnified by the magnifying lens 26 and focused as a normal telescopic image on the second CCD 24.

Figure 6A:
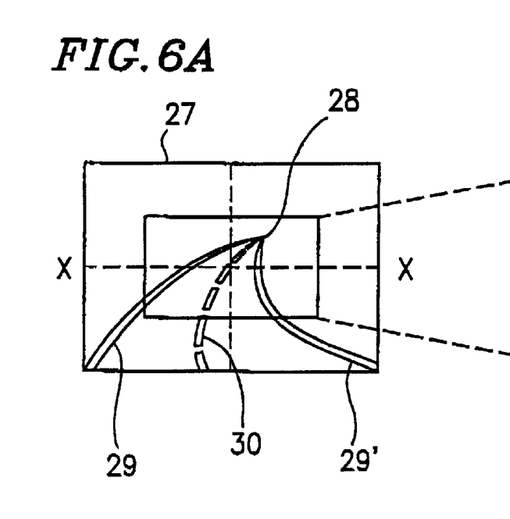
FIG. 6A is a view illustrating a wide-angle image obtained when a mirror image obtained on a first CCD is re-inverted using an electric signal in Example 3.

FIG. 6A illustrates a wide-angle image 27 obtained by re-inverting the mirror image obtained on the first CCD 23 using an electric signal. A fade-out point 28 in the wide-angle image 27 is an infinite point on a road. Left and right white lines 29 and 29' on the road intersect with each other at the fade-out point 28 as the infinite point. A broken line 30 on the road also intersects with the white lines 29 and 29' at the fade-out point 28.

Figure 6B:
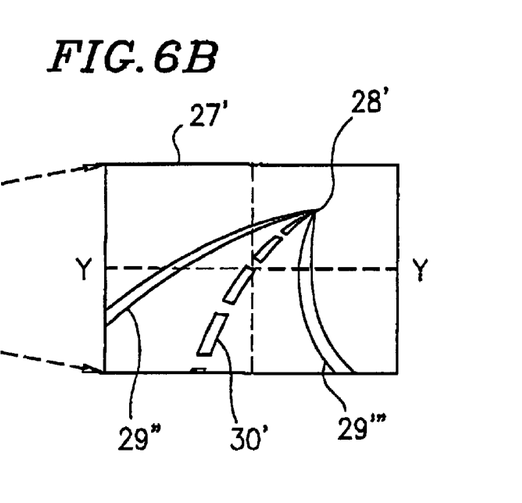
FIG. 6B is a view illustrating a telescopic image obtained on a second CCD in Example 3.

FIG. 6B illustrates a telescopic image 27' obtained on the second CCD 24. As in FIG. 6A, a fade-out point 28' in the telescopic image 27' is an infinite point on the road. Left and right white lines 29" and 29'" intersect with each other at the fade-out point 28' as the infinite point. A broken line 30' on the road also intersects with the white lines 29" and 29'" at the fade-out point 28'. Since the wide-angle image 27 and the telescopic image 27' are obtained from the coaxial optical system, the optical axes of these images can be aligned with each other. Also, considering the telescopic image 27' as a magnified image of a portion of the wide-angle image 27 by a simple operation, the two images can be superimposed.

Figure 7A:
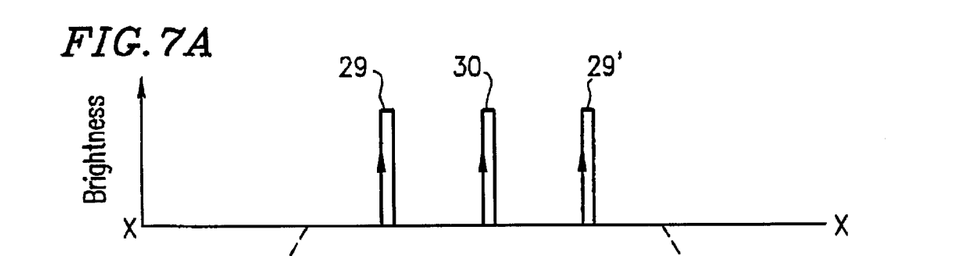
FIG. 7A and 7B are views schematically illustrating changes in brightness signals along a raster X—X in FIG. 6A and a raster Y—Y in FIG. 6B, respectively.
Figure 7B:
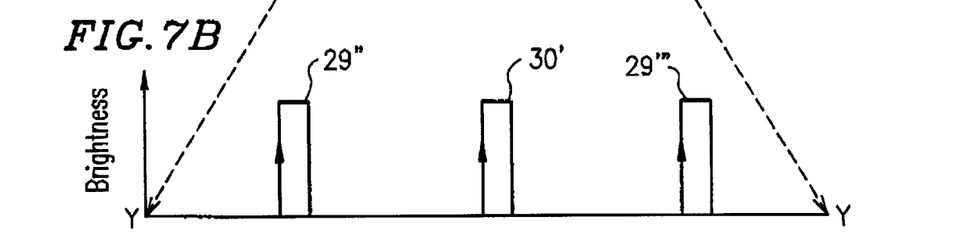

FIGS. 7A and 7B schematically show changes in brightness signals along a raster X—X in FIG. 6A and a raster Y—Y in FIG. 6B, respectively. In FIG. 6A, the left white line 29, the broken line 30, and the right white line 29' on the road are positioned in the order from left to right in the normal image 27 obtained on the first CCD 23, and the signal X—X of FIG. 7A represents the change in brightness in the above order. When the rising of the brightness of the white line is used for the detection of the white line 29, the left edge of the white line is detected. Likewise, the left edges of the broken line 30 and the right white line 29' are detected in this order, thus continuously detecting the white lines along the raster. In this way, the geometry of the road using the left edges of the white lines is recognized.

In FIG. 6B, the left white line 29", the broken line 30', and the right white line 29'" on the road are positioned in the order from left to right in the telescopic image 27' obtained on the second CCD 24, and the signal Y—Y of FIG. 7B represents the change in brightness in the above order. Unlike FIG. 7A, since the telescopic image 27' corresponds to a magnified view of a portion of the wide-angle image 27, the width of the white line 29", the broken line 30', and the white line 29'" and the distances therebetween have been magnified. This allows the white lines on the road in the telescopic image to be observed In more detail. The road geometry can be recognized by continuously detecting the white lines along the raster.

Thus, the road geometry using the left edges of the white lines in the wide-angle image and the road geometry using the left edges of the white lines in the telescopic image are recognized. These two road geometries basically match with each other. In the case where the white lines are blurred or defective, such a blurred or defective portion can be mutually complemented by the correlation with each other. In this way, the precision of the recognition of the white lines can be improved.

EXAMPLE 4

Figure 8:
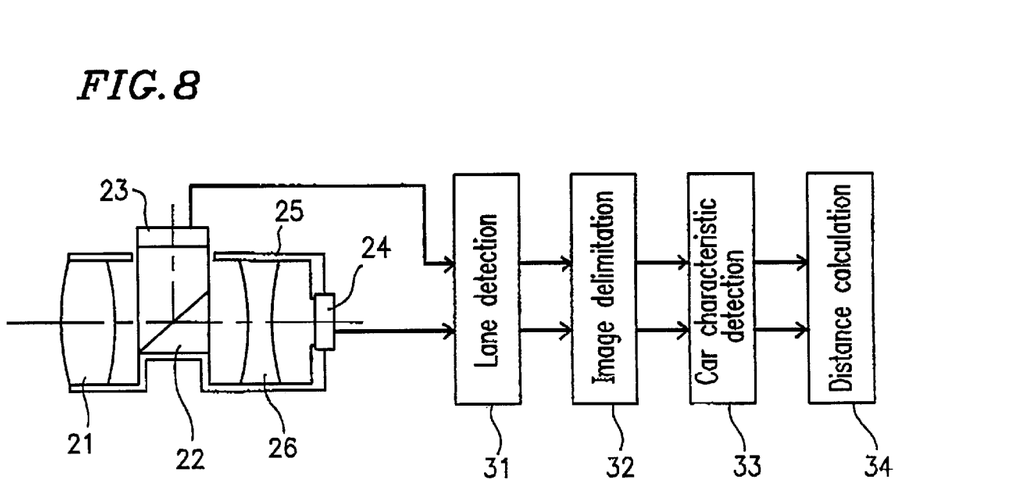
FIG. 8 is a block diagram of a distance measurement apparatus according to the present invention.

FIG. 8 is a block diagram of a distance measurement apparatus of Example 4 according to the present invention for measuring the distance between cars. The apparatus of this example includes an optical system for an imaging apparatus which is the same as the optical system for the imaging apparatus of Example 3 shown in FIG. 5.

Referring to FIG. 8, the distance measurement apparatus of this example includes the lens 21, the half mirror 22, the first CCD 23, the second CCD 24, the housing 25, the magnifying mirror 26, a lane detection section 31, an image delimitation section 32, a car characteristic detection section 33, and a distance calculation section 34.

In the optical system for the imaging apparatus, the lens 21, the half mirror 22, the magnifying lens 26, and the second CCD 24 are arranged coaxially, while the first CCD 23 is arranged along an axis of light reflected by the half mirror 22. The wide-angle image and the telescopic image output from the two CCDs 23 and 24 are supplied to respective portions for the wide-angle and telescopic images of the lane detection section 31, the image delimitation section 32, the car characteristic detection section 33, and the distance calculation section 34 for processing.

Figure 9:
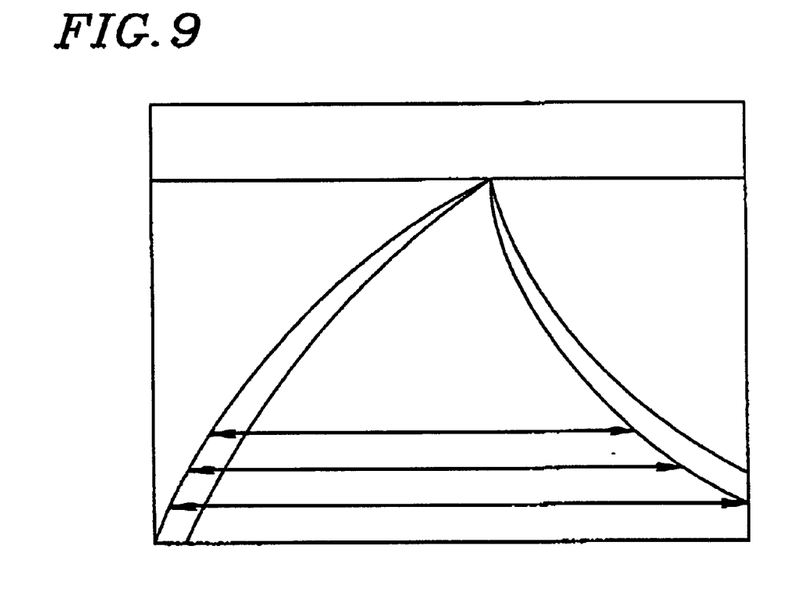
FIG. 9 is a view illustrating a white-line edge detection method employed in the distance measurement apparatus according to the present invention.

The operation of the distance measurement apparatus with the above configuration will be described with reference to FIGS. 8 and 9.

As described in Example 3, part of light incident on the lens 21 is reflected by the half mirror 22 to be focused as a wide-angle mirror image on the first CCD 23 disposed along the axis of the reflected light. The remainder of the incident light which has passed through the half mirror 22 is magnified by the magnifying lens 26 and focused as a normal telescopic image on the second CCD 24.

The wide-angle image 27 obtained by re-inverting the mirror image obtained on the first CCD 23 using an electric signal is input into the lane detection section 31. The telescopic image 271 obtained on the second CCD 24 is also input into the lane detection section 31. As shown in FIG. 9, the lane detection section 31 detects vertical edges by scanning rightward and leftward along the scanning lines starting from the center of the bottom of each of the wide-angle image and the telescopic image to the top. The edges detected first are determined as outline points of the white lines on the road.

The image delimitation section 32 converts the outline points on the Image plane into coordinates on a plane coordinate system of the actual distance. More specifically, the outline points on the image plane coordinate system (hereinbelow, referred to as the "x-y plane coordinate system) are converted into points on a plane coordinate system where the Y-axis of an X-Y-Z stereo coordinate system corresponds to the road surface (hereinbelow, referred to as an "X-Z plane coordinate system") shown in FIG. 10. X, Y, and Z of this coordinate system are represented as follows.

Figure 10:
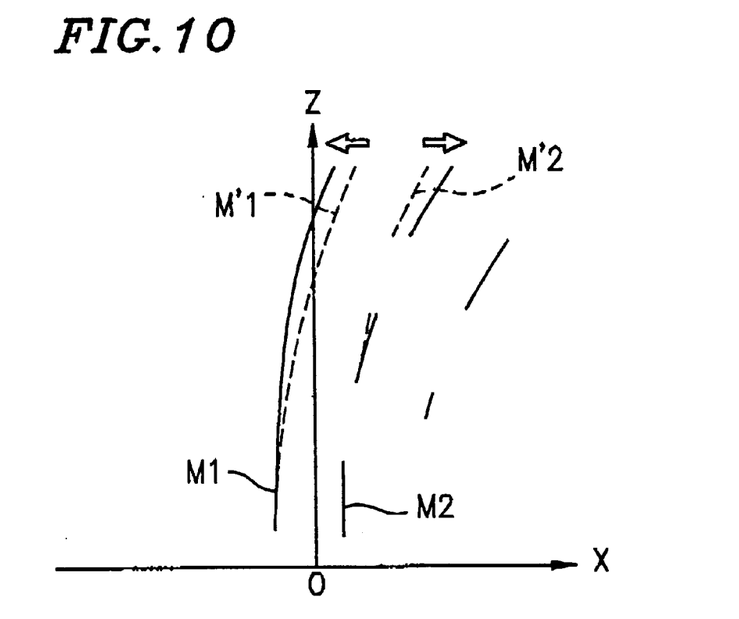
FIG. 10 is an X-Z plane coordinate system used in the distance measurement apparatus according to the present invention.

$X=(x/F) (Z \cos \theta - Y \sin \theta)$ $Z=Y (F \cos \theta + y \sin \theta)/(y \cos \theta - F \sin \theta)$ $Y=-H$ wherein F denotes the focal distance of the lens of the Imaging apparatus, e denotes the tilt angle of the optical axis, and H denotes the height of the imaging apparatus from the road surface.

If the car receives a change in pitch angle or a vertical vibration, the outlines of the right and left white lines are no longer in parallel with each other. In such a case, the outlines on the x-y plane coordinate system are shifted upward or downward to make the outlines of the right and left white lines parallel with each other. Then, the above conversion is performed, so that the outlines of the right and left white lines on the X–Z plane coordinate system are in parallel with each other. Thus, the change in pitch angle or the vertical vibration is corrected.

Figure 11:
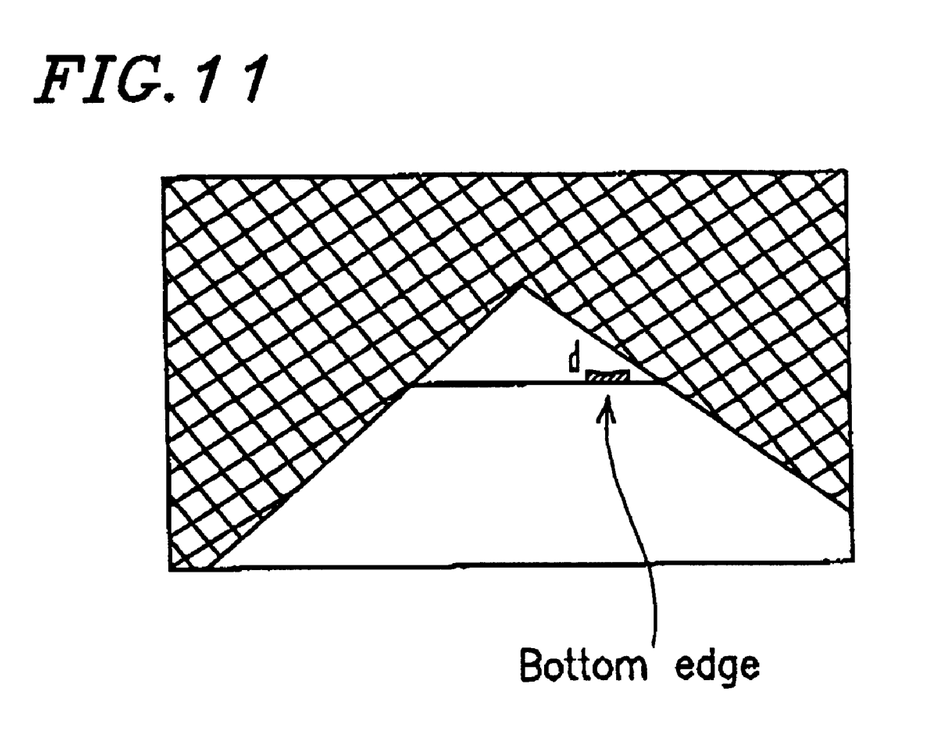
FIG. 11 is a view illustrating horizontal edge detection performed in the distance measurement apparatus according to the present invention.

The detected outline points are linked together starting from the bottom of the image. In this way, the image delimitation section delimits an area of the lane along which the car is travelling ahead of the car in the images received from the lane detection section 31 by using the lane along which the car is travelling detected by the lane detection section 31;

As shown in FIG. 11, the car characteristic detection section 33 detects horizontal edges in an area surrounded by right and left detection curves for each of the wide-angle image and the telescopic image. The number of edge points existing on each column of pixels in the direction vertical to the scanning line is then counted to produce a histogram.

The histogram is searched from the bottom to the top, and the scanning line position where the number of edge points first exceeds a threshold value EB is determined as the position of a car travelling ahead. It is confirmed that the car has been detected at the same position in the wide-angle image and the telescopic image by overlapping the fade-out points in these images with each other.

The distance calculation section 34 calculates the distance between the car and the car travelling ahead based on the scanning line position from the bottom of the image, and the height and the angle of depression of the imaging apparatus from the road surface. The smaller one of the values of the distance between the cars calculated from the wide-angle and telescopic image is determined as the distance between the cars.

EXAMPLE 5

A distance measurement apparatus of Example 5 according to the present invention will be described with reference to FIG. 8. In this example, the distance measurement apparatus includes a lens 21, a half mirror 22, an infrared-sensitive CCD 23, a visible-light-sensitive CCD 24, a lane detection section 31, an image delimitation section 32, a car characteristic detection section 33, and a distance calculation section 34.

The operation of the distance measurement apparatus with the above configuration will be described.

Part of infrared light incident on the lens 21 is reflected by the half mirror 22 to be focused as an image on the infrared-sensitive CCD 23. Part of visible light which has passed through the half mirror 22 is focused as an image on the visible-light-sensitive CCD 24.

An image obtained by re-inverting the image obtained on the CCD 23 using an electric signal is input into the lane detection section 31. The image obtained on the CCD 24 is also input into the lane detection section 31. The lane detection section 31 detects vertical edges by scanning rightward and leftward along the scanning lines starting from the center of the bottom of each of the infrared image and the visible-light image to the top. The edges detected first are determined as outline points of the white lines on the road.

The image delimitation section 32 converts the outline points on the image plane into coordinates on a plane coordinate system of the actual distance. More specifically, the outline points on the image plane coordinate system (hereinbelow, referred to as the "x-y plane coordinate system) are converted into points on a plane coordinate system where the y-axis of an X-Y-Z stereo coordinate system corresponds to the road surface (hereinbelow, referred to as an "X-Z plane coordinate system). X, Y, and Z of this coordinate system are represented as follows.

$X=(x/F)(Z \cos \theta - Y \sin \theta)$ $Z=Y(F \cos \theta + y \sin \theta)/(y \cos \theta - F \sin \theta)$ $Y=H$ wherein F denotes the focal distance of the lens of the imaging apparatus, θ denotes the tilt angle of the optical axis, and H denotes the height of the imaging apparatus from the road surface.

If a car receives a change in pitch angle or a vertical vibration, the outlines (M1 and M2) of the right and left white lines are no longer parallel with each other. In such a case, the outlines on the x-y plane coordinate system are shifted upward or downward to make the outlines (M'1 and M'2) of the right and left white lines parallel with each other. Then, the above conversion is performed, so that the outlines of the right and left white lines on the X-Z plane coordinate system are in parallel with each other. Thus, the change in pitch angle or the vertical vibration is corrected.

The detected outline points are linked together from the bottom of the image.

The car characteristic detection section 33 detects horizontal edges in an area surrounded by right and left detection curves for each of the infrared image and the visible-light image. The number of edge points existing on each column of pixels in the direction vertical to the scanning line is then counted to produce a histogram.

The histogram is searched from the bottom to the top, and the scanning line position where the number of edge points first exceeds a threshold value EB is determined as the position of the car. It is confirmed that the car has been detected at the same position in the infrared image and the visible-light image by overlapping the fade-out points in these images with each other.

The distance calculation section 34 calculates the distance between the car and a car travelling ahead based on the scanning line position from the bottom of the image, and the height and the angle of depression of the imaging apparatus from the road surface.

A telescopic car tracing section is also provided for extracting a car characteristic closest to the bottom of the image among the car characteristics detected by a telescopic portion of the car characteristic detection section 33 and tracing the extracted car characteristic.

Also, a car determination section is provided for determining that a car detected by a wide-angle portion of the car characteristic detection section 33 is identical to the car traced by the telescopic car tracing section.

A wide-angle distance calculation section is also provided for calculating a distance between the car and a car travelling ahead by using a car characteristic from the car determination section obtained when the car determined by the car determination section has just moved outside from the bottom of the image in the telescopic car tracing section.

Thus, the imaging apparatus according to the present invention includes the optical system having the lens 1, the half mirror 2, and the second CCD 4 arranged coaxially, and the first CCD 3 arranged on the axis of light reflected from the half mirror. With this configuration, since the road geometry using the left edges of the white lines and the road geometry using the right edges of the white lines are recognized by individual signals having no correlation with each other. Accordingly, in the case where the white lines are blurred or defective, such a blurred or defective portion can be complemented by the correlation with each other without mutual interference. In this way, the precision of the recognition of the white lines can be improved.

Since one raster is scanned from the opposite directions of an image simultaneously, the image can be taken and processed in parallel at high speed, allowing for high-speed image recognition.

Furthermore, since two CCDs are incorporated in one optical system, such an optical system is small in size. This is suitable for applications in cars where a smaller apparatus is required.

According to another embodiment of the invention, the road geometry using the left edges of the white lines is obtained from the image which had passed through the color filter. Accordingly, the resultant road geometry is different in contrast from the road geometry using the right edges of the white lines obtained from the image without using a color filter. In the case where the white lines are blurred or defective, therefore, such a blurred or defective portion can be complemented by the correlation with each other. In this way, the precision of the recognition of the white lines can be improved.

According to still another embodiment of the invention, the road geometry using the left edges of the white lines in the wide-angle image and the road geometry using the left edges of the white lines in the telescopic image are recognized. These two road geometries basically match with each other. In the case where the white lines are blurred or defective, such a blurred or defective portion can be mutually complemented by the correlation with each other. In this way, the precision of the recognition of the white lines can be improved.

According to still another embodiment of the invention, the road geometry using the left edges of the white lines in the wide-angle image and the road geometry using the left edges of the white lines in the telescopic image are recognized. These two road geometries basically match with each other. In the case where the white lines are blurred or defective in the wide-angle image, the telescopic image which corresponds to a magnified image of a portion of the wide-angle image can be used to detect the white lines on the road in more detail. Such a blurred or defective portion can be complemented by the correlation with each other. In this way, the precision of the recognition of the white lines can be improved.

Various other modifications will be apparent to and can be readily made by those skilled in the art without departing from the scope and spirit of this invention. Accordingly, it is not intended that the scope of the claims appended hereto be delimited to the description as set forth herein, but rather that the claims be broadly construed.

What is claimed is:

1. An imaging apparatus, comprising:
   a lens, a half mirror, and a first CCD arranged along a same optical axis; and
   a second CCD arranged on an axis of light reflected from the half mirror,
   wherein the first CCD and the second CCD one have an inverse relationship in which one of the first and second CCDs outputs as an output signal a normal image of an input image input via the lens while the other CCD simultaneously outputs as an output signal an inverted image of the input image, the output signal of the one of the first and second CCDs representing a raster scan image of the input image from left to right and the output signal of the other CCD representing a raster scan image of the input image from right to left; and
   further comprising an image processor circuit for processing the output signals of the first and second CCDs based on their inverse relationship in order to perform image recognition.

2. An imaging apparatus according to claim 1, further comprising a wavelength selective optical element on an optical path from the lens to at least one of the first and second CCDs.

3. An imaging apparatus according to claim 2, wherein the wavelength selective optical element is an infrared filter.

4. An imaging apparatus according to claim 2, wherein the half mirror also functions as the wavelength selective optical element which selectively reflects infrared radiation.

5. An imaging apparatus according to claim 2, wherein the half mirror also functions as the wavelength selective optical element which selectively transmits infrared radiation.

6. An imaging apparatus according to claim 1, further comprising a magnifying lens on an optical path from the lens to at least one of the first and second CCDs.

7. An imaging apparatus according to claim 1, further comprising a circuit for detecting a correlation between the normal image and the inverted image.

* * * * *